(12) United States Patent
Drake et al.

(10) Patent No.: US 9,725,883 B2
(45) Date of Patent: Aug. 8, 2017

(54) MACHINE POWER CONTROL WITH RATIO INCREASE

(75) Inventors: Benjamin D. Drake, East Peoria, IL (US); Philip F. Lange, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 1922 days.

(21) Appl. No.: 12/371,692

(22) Filed: Feb. 16, 2009

(65) Prior Publication Data

US 2009/0223214 A1 Sep. 10, 2009

(30) Foreign Application Priority Data

Feb. 15, 2008 (EP) .................................... 08151536

(51) Int. Cl.
*E02F 9/22* (2006.01)
*B60K 6/12* (2006.01)
(Continued)

(52) U.S. Cl.
CPC .............. *E02F 9/2246* (2013.01); *B60K 6/12* (2013.01); *B60W 10/105* (2013.01); *B60W 10/26* (2013.01); *E02F 9/225* (2013.01); *E02F 9/2253* (2013.01); *B60Y 2200/415* (2013.01); *Y02T 10/6208* (2013.01)

(58) Field of Classification Search
USPC ......................................................... 701/50
See application file for complete search history.

(56) References Cited

U.S. PATENT DOCUMENTS 4,445,078 A * 4/1984 Lange ........................... 318/729
5,065,326 A * 11/1991 Sahm .............................. 701/50
(Continued)

OTHER PUBLICATIONS

John Deere "2006 John Deere Forestry News and Press Releases" [online], (retrieved Feb. 24, 2009) Retrieved from the database of the John Deere website using internet <URL: http://www.deere.com/en_us/cfd/forestry/deere_forestry/info_center/newsroom/press_releases/pf_060906_1110d_eco.html.

*Primary Examiner* — Nicholas Kiswanto

(57) ABSTRACT

A control system for a machine having a power source configured to provide power, a number of implements including a work implement, configured to provide operations, and a number of power transmitting paths configurable to selectively make power available to the implements to perform operations. The control system may include a control arrangement configured to regulate the power source to provide a first level of available power, to configure a first power transmitting path to make a percentage A1 of said first level of power available to provide a first operation, and to configure a second power transmitting path to make a percentage A2 of said first level of power available to provide a second operation, at least the second operation being a work operation. The control arrangement may further be configured to increase said first level of available power of said power source to a second level of available power, to configure the first power transmitting path to make a percentage B1 of said second level op power available to provide said first operation, and to configure the second power transmitting path to make a percentage B2 of said second level of power available to provide said second operation, such that the ratio B2/B1 is greater than the ratio A2/A1.

17 Claims, 3 Drawing Sheets

(51) Int. Cl.
*B60W 10/105*     (2012.01)
*B60W 10/26*     (2006.01)

(56) References Cited

U.S. PATENT DOCUMENTS

| | | |
|---|---|---|
| 5,967,756 A | 10/1999 | Devier et al. |
| 6,022,292 A * | 2/2000 | Goodnight .................... 477/121 |
| 6,314,727 B1 | 11/2001 | Prabhu et al. |
| 6,975,930 B2 * | 12/2005 | Drake et al. .................... 701/51 |
| 7,273,125 B2 * | 9/2007 | Schuh ........................... 180/305 |
| 7,930,843 B2 * | 4/2011 | Hartwick ........................ 37/348 |
| 2006/0201147 A1 | 9/2006 | Nakamura et al. |
| 2006/0229786 A1 * | 10/2006 | Sawada ............................ 701/50 |
| 2007/0204605 A1 | 9/2007 | Itoga et al. |
| 2011/0087407 A1 * | 4/2011 | Filla ................................ 701/50 |
| 2011/0228816 A1 * | 9/2011 | Lomp ............................ 375/130 |
| 2011/0231070 A1 * | 9/2011 | Toda ................................ 701/50 |

\* cited by examiner

MACHINE POWER CONTROL WITH RATIO INCREASE

TECHNICAL FIELD

The present disclosure relates generally to machine power control and, more particularly, to machine power control with ratio increase.

BACKGROUND

Mobile machines, including track-type tractors, bulldozers, wheel loaders, motor graders, and other types of heavy equipment, are used for a variety of tasks. In other to accomplish these tasks, the machines typically include a power source configured to provide power, a number of implements including a work implement, that are configured to provide operations, and a number of power transmitting paths configurable to selectively make power available to the implements to perform operations.

The power source may commonly comprise an engine, the implements may commonly include a traction device, the work implement may commonly include a boom, and the power transmitting paths may commonly include a hydrostatic drive extending between the power source and the traction device, as well as an additional hydraulic power system extending between the power source and the work implement.

During operation, the power source may be regulated by a control arrangement to provide a substantially constant level of available power. Conventionally, the substantially constant level of available power corresponds to a high idle operating level of the power source. Such a high idle level may be a standard elevated idle level, or may for example be one of several elevated idle levels such as a power idle level and an economy idle level. The control arrangement my further configure a first power transmitting path to make a percentage of the level of power available to provide a first operation, for example by configuring the hydrostatic transmission to drive the traction device, and may configure a second power transmitting path to make a percentage of the level of available power to provide a second operation involving actuating a work implement, for example configuring the additional hydraulic power system to actuate a boom lift cylinder.

In some cases, even when an operator control has been set to a maximum value, an operator may still wish to further increase the power to actuate the work implement. For example, even at a maximum boom lift setting, the boom lift speed may not be perceived as adequate to the operator. In practice, the operator may increase the level of available power, for example by setting the power source to a higher idle level. However, this may cause that the power source is operated rather often on a relatively high idle level causing for example unnecessary wear, vibrations, noise and emissions, and in some cases even the highest idle level available may not offer a fully satisfactory result to the operator.

The disclosed machine control is directed at alleviating one or more of the disadvantages set forth above.

SUMMARY OF THE INVENTION

One aspect of the present disclosure is directed to a control system for a machine having a power source configured to provide power, a number of implements including a work implement, configured to provide operations, and a number of power transmitting paths configurable to selectively make power available to the implements to perform operations. The control system may include a control arrangement configured to regulate the power source to provide a first level of available power, to configure a first power transmitting path to make a percentage A1 of said first level of power available to provide a first operation, and to configure a second power transmitting path to make a percentage A2 of said first level of power available to provide a second operation, at least the second operations being a work operation. The control arrangement may further be configured to increase said first level of available power of said power source to a second level of available power, to configure the first power transmitting path to make a percentage B1 of said second level of available power available to provide said first operation, and to configure the second power transmitting path to make a percentage B2 of said second level of power available to provide said second operation, such that the ratio B2/B1 is greater than the ratio A2/A1.

Another aspect of the present disclosure is directed to a method of controlling a machine comprising providing a first level of available power, using a percentage A1 of said first level of available power to provide a first operation, and using a percentage A2 of said first level of available power to provide a second operation, at least the second operation being a work operation. The method may further comprise increasing said first level of available power to a second level of available power, using a percentage B1 of said second level of available power to provide said first operation, and using a percentage B2 of said second level of available power to provide said second operation such that the ratio B2/B1 is greater than the ratio A2/A1.

DETAILED DESCRIPTION

Figure 1:
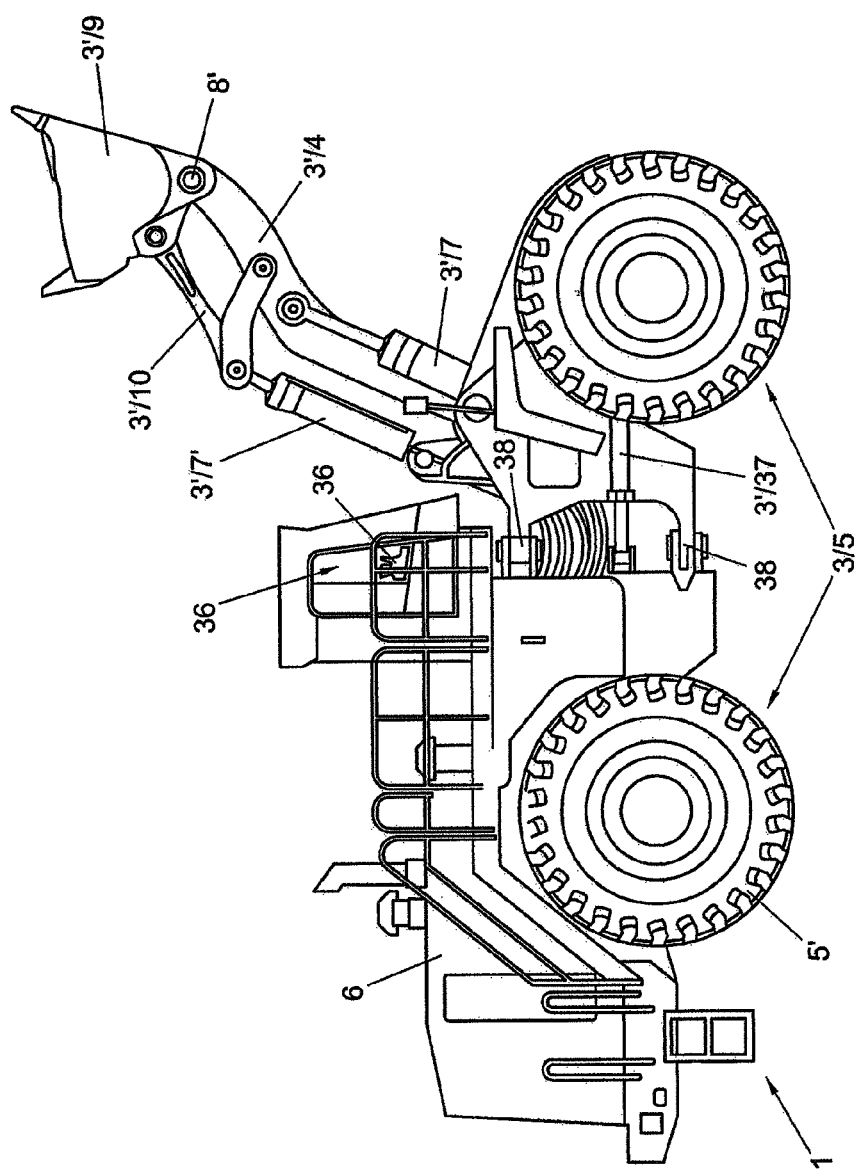
FIG. 1 is a diagrammatic illustration of an exemplary disclosed machine.

FIG. 1 illustrates an exemplary disclosed embodiment of a machine 1. The machine 1 may be a mobile machine that performs some type of operation associated with an industry, such as mining, construction, farming, or any other industry known in the art. For example, the machine 1 may be an earth moving machine, such as a wheel loader, an excavator, a backhoe, or a motor grader. In the exemplary disclosed embodiment of FIG. 1, the machine 1 is shown as being a wheel loader.

The machine 1 may include a power source 2 configured to provide power. The power source 2 may embody an engine, such as a diesel engine, a gasoline engine, a gaseous fuel powered engine, for example a natural gas engine, or any other type of combustion engine. The power source 2 may alternatively embody a non-combustion source of power, such as a fuel cell, a power storage device, an electric motor or other similar mechanism.

The machine 1 may include a number of implements 3, configured to provide operations. The implements 3 may include a traction device 5 to move the machine 1. The traction device 5 may include wheels 5'. Alternatively, the traction device 5 may include tracks, belts or other types of traction elements that may be used to move the machine 1. Another implement 3 may be a height control device to set the height of the machine frame 6 relative to the ground (not shown), or a drive 37 for a frame hinge 38 to adjust two frame portions of an articulated machine frame relative to each other.

The implements 3 may further include a work implement 3'. The work implement 3' may include any device used to perform a work operation, such as a boom, a bucket, a blade, a shovel, a ripper, a winch or any other task-performing device known in the art.

Within the context of this patent application, a work operation may be any type of operation performed by a machine implement, excluding operations for steering or propelling the machine. Further, within the context of this patent application, a work implement may be any machine implement, excluding implements for steering or propelling the machine.

The work implement 3' may be connected to the machine 1 via a direct pivot, via a linkage system, via one or more hydraulic cylinders, via a motor or in any other appropriate way. The work implement 3' may pivot, rotate, slide, swing, lift, or move relative to the machine 1 in any way. In the exemplary disclosed embodiment of FIG. 1, the work implement 3' may be a boom 4 that is connected to the machine frame 6 via a pivot 8 (not shown) and that may be raised and lowered by swiveling it around the pivot 8 using a hydraulic cylinder 7 extending between the machine frame 6 and the boom 4. The boom 4 may carry a bucket 9 via a further pivot 8', and may be actuated to swivel about the further pivot 8' via a linkage system 10 that includes a further hydraulic cylinder 7'.

The machine 1 may include a number of power transmitting paths configurable to selectively make power available to the implements 3 to perform operations. Within this context, a power transmitting path is meant to comprise any chain of elements that may be configured to transmit power between the power source 2 and the implement 3. Such a power chain may include mechanical, electrical, pneumatic and/or hydraulic drive elements. In the exemplary disclosed embodiment of FIG. 2, a first power transmitting path 13 has been indicated with reference numeral 12, while a second power transmitting path has been indicated with reference numeral 13. A first power transmitting path 12 may for example include a transmission 14 extending between the power source 2 and the traction device 5. A second power transmitting path 13 may for example include an additional power system 19 extending between the power source 2 and the work implement 3'. The transmission 14 may be a hydrostatic transmission, an electric transmission, a mechanical transmission, a hydro-mechanical transmission or any other means for transmitting power from a power source 2 to a traction device 5.

Figure 2:
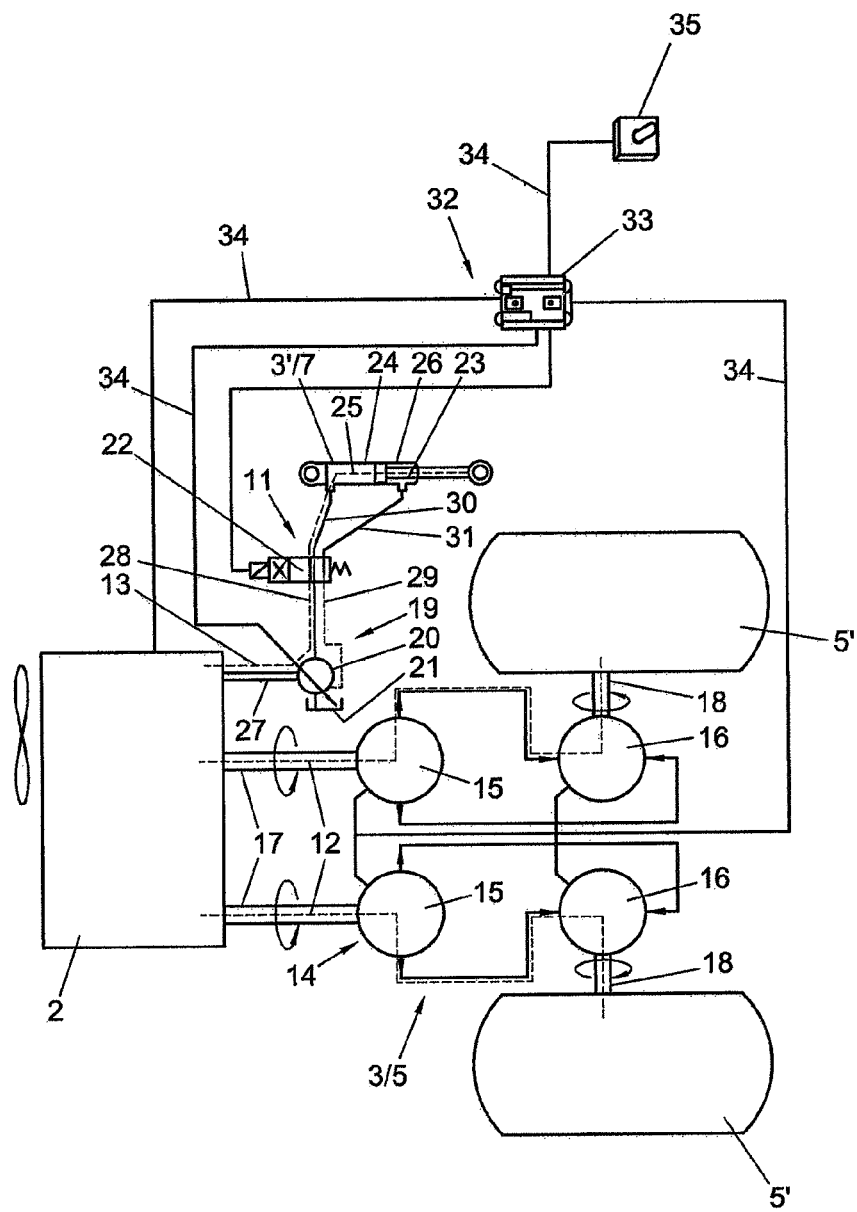
FIG. 2 is a schematic and diagrammatic illustration of an exemplary disclosed control system for use with the machine of FIG. 1.

As illustrated in FIG. 2, in the exemplary disclosed embodiment, the transmission 14 may be a hydrostatic transmission. The transmission 14 may include two pumps 15 fluidly connected to two hydraulic motors 16 in a dual path configuration, each path driving a traction element. The pumps 15 and the hydraulic motors 16 may be variable displacement, variable delivery, fixed displacement or any other configuration known in the art. Each of the pumps 15 may be directly connected to the power source 2 via an input shaft 17. Alternatively, the pumps 15 may be connected to the power source 2 via a torque converter, a gear box, or in any other matter known in the art. The transmission 14 may also include an output shaft 18 connecting each hydraulic motor 16 to one of the traction devices 5. The machine 1 may or may not include a reduction gear arrangement such as, for example, a planetary gear arrangement disposed between each hydraulic motor 16 and the associated traction device 5. In another embodiment, the transmission 14 may for example include a single pump 15. In another embodiment, the transmission 14 may include a mechanical transmission (not shown). Such a mechanical transmission may be embodied as a multi-speed bidirectional, mechanical transmission having a neutral gear ratio, a plurality of forward gear ratios, one or more reverse gear ratios and one or more clutches. The mechanical transmission may selectively actuate the clutches to engage predetermined combinations of gears that produce a desired output gear ratio. The mechanical transmission may be a manual or an automatic-type transmission. The mechanical transmission may be connected to the power source 2 by way of a torque converter. The output of the mechanical transmission may be connected to rotatably drive the traction device 5 via an output shaft 18, to move the machine 1.

The additional power system 19 for an example be a hydraulic power system, an electric power system, a pneumatic power system or combination thereof. As shown in FIG. 2, in the exemplary disclosed embodiment, the additional power system 19 may be an additional hydraulic power system. The additional power system 19 may have a plurality of components that cooperate to actuate the work implement 3'. Specifically, the additional power system 19 may include a hydraulic circuit 11 including one or more hydraulic cylinders 7, a hydraulic pump 20 for pressurizing hydraulic fluid, a tank 21 and a control valve 22. Fluid may be drawn from the tank 21 by the hydraulic pump 20 to be pressurized. Once pressurized, the fluid flow may be metered by a control valve 22 and may for example be supplied to a hydraulic cylinder 7 or hydraulic motor of a work implement 3' of the machine 1 to perform a work operation. Low pressure fluid may be returned to the tank 21 to allow further use by the hydraulic pump 20. The hydraulic system may include additional or different components than those illustrated in FIG. 2 and listed above, such as accumulators, check valves, pressure relief or make up valves, pressure compensating elements, restrictive orifices and other hydraulic components known in the art.

The extension and retraction of a hydraulic cylinder 7 may be affected by creating an imbalance of force on a piston assembly 23 disposed within in a tube 24 of the hydraulic cylinder 7. Specifically, the hydraulic cylinder 7 may include a first chamber 25 and a second chamber 25 separated by the piston assembly 23. The piston assembly 23 may include two opposing hydraulic surfaces, one associated with each of the first and second chambers 24,25. Via the control valve 22, the first and second chambers 24,25 may be selectively supplied with a pressurized fluid and drained of the pressurized fluid via respective first and second hydraulic lines 30,31 so that an imbalance of force on the two surfaces may be created. This is imbalance of force may cause the piston assembly 23 to axially displace within the tube 24.

The hydraulic pump 20 may in the additional power system 19 produce a flow of pressurized fluid for using implements 3 of the machine 1. The hydraulic pump 20 may embody a variable displacement pump, a fixed displacement pump, a variable flow pump for any other source of pressurized fluid known in the art. The hydraulic pump 20 may be drivably connected to the power source 2 by, for example a drive shaft 27, a belt (not shown), an electric circuit (not shown) or in any other suitable way. Although FIG. 2 illustrates the hydraulic pump 20 as being dedicated to supply pressurized fluid to only one hydraulic cylinder 7, the hydraulic pump 20 may alternatively supply pressurized fluid to additional hydraulic cylinders 7' or other hydraulic components of the machine 1.

The tank 21 may embody a reservoir configured to hold a supply of fluid. The fluid may include, for example, a hydraulic oil, an engine lubrication oil, a transmission lubrication oil or any other fluid known in the art. The hydraulic pump 20 may draw fluid from the tank 21 and may return fluid to the tank 21. It is contemplated that the hydraulic pump 20 may be connected to multiple separate fluid tanks 21.

The control valve 22 may allow fluidic communication between the hydraulic pump 20 and the tank 21. Specifically the control valve 22 may be connected to the hydraulic pump 20 via a supply line 28, and to the tank 21 via a drain line 29 to control actuation of the hydraulic cylinder 7. The control valve 22 may include at least one valve element that functions to meter pressurized fluid to one of the first and second chambers 24,25 within the hydraulic cylinder 7, and to simultaneously allow fluid from the other of the first and second chambers 24,25 to drain to the tank 21. In one example, the control valve 22 may be pilot actuated against a spring bias to move between the first position, in which fluid is allowed to flow into the first chamber 24 while fluid drains from the second chamber 25 to the tank 21, a second (neutral) position, at which fluid flow may be blocked from both the first and second chambers 24,25, and a third position, at which the flow directions from the first position are reversed. The location of the control valve 22 between the first, second and third positions may determine a flow rate of the pressurized fluid into and out of the associated first and second chambers 24,25 and a corresponding actuation velocity. It is contemplated that the control valve 22 may alternatively be replaced with multiple independent metering valves that control the filling and draining functions of each of the first and second chambers 24,25 for each hydraulic cylinder 7 separately. It is further contemplated that the control valve 22 may alternatively be electrically actuated, mechanically actuated, pneumatically actuated or actuated in any other suitable way.

The machine 1 may include a control arrangement 32. The control arrangement 32 may include components that monitor and modify the performance of the machine 1 and its components. In particular, the control arrangement 32 may include a control unit that may be in communication with the power source 2, the transmission 14, the additional power system 19, and the operator input device 35, for example via communication lines 34. The control arrangement 32 may regulate the speed of the power source 2, and may configure power transmitting paths in the transmission 14 and the additional power system 19 based on operator input. In particular, as will be set out more in detail in the next section, the control arrangement 32 may regulate the power source 2 to provide a first level of available power, and may configure a first power transmitting path 12 to make a percentage A1 of the first level of power available to provide a first operation. In the exemplary embodiment, the first level of available power may correspond to a high idle of the power source 2, and the first power transmitting path 12 may extend between the power source 2 and the traction device 5 to propel the machine 1. In the exemplary disclosed embodiment, the control arrangement 32 may for example set the engine to a high idle of 2000 RPM. Further, the control arrangement 32 may set the flow of the pump 15 and the stroke of the hydraulic motors 16 so that 50% of the available power is provided to drive the wheels 5'. The control arrangement 32 may further configure a second power transmitting path 13 to make a percentage A2 of said first level of power available to provide a second operation, at least one of said first and second operation being a work operation. Specifically, the second power transmitting path 13 may extend through the additional power system 19 between the power source 2 and the work implement 3'. In the exemplary disclosed embodiment the control arrangement 32 may set the flow of the hydraulic pump 20 and the control valve 22 in the additional power system 19 such that 5% of the available power is provided to lift the boom 4.

Is shall be noted that within the context of this patent application, the identifiers 'first' and 'second' to the term 'operation' are only meant to distinguish two operations, and are not meant to convey a hierarchy. The operation identified as 'second' operation may thus for example in time have commenced before an operation identified as 'first' operation or vice versa. Also the operation identified as 'second' operation may actually by a main operation, while the operation identified as 'first' operation may actually be a peripheral operation. In addition, the 'first' and 'second' operations may be for example of the same type, i.e. both the first and second operations may be work operations, and may even be the same type of work operations. The 'first' and 'second' operations may also be of different types, for example the first operation being a machine operation to move the machine and the second operation being a work operation to actuate a work implement. Further, it shall be noted that within the context of this application the term 'work operation' is meant to comprise an operation in which a work implement is operated.

The control arrangement 32 may further be configured to increase the first level of available power of the power source 2 to a second level of available power. The second level of available power may for example be a temporary increase engine speed. The level of available power may be increased from the first level to the second level in response to an operator command that may be provided by the operator input device 35. The control arrangement 32 may further be arranged to configure the first power transmitting path 12 to make a percentage B1 of said second level of power available to provide said first operation, and to configure the second power transmitting path to make a percentage B2 of said second level of power available to provide said second operation, such that the ratio B2/B1 is greater than the ratio A2/A1. In the exemplary disclosed embodiment, the control arrangement 32 may for example reduce the flow of the pump 15 and the stroke of the hydraulic motors 16 so that 40% of the second level of available power is provided to drive the wheels 5'. In the exemplary disclosed embodiment, the control arrangement 32 may for example further increase the flow of the hydraulic pump 20 in the additional power system 19 such that 10% of the second level of available power is provided to lift the boom 4.

The control arrangement 32 may embody a control unit 33 having single micro processor or may embody multiple micro processors that include an arrangement for controlling an operation of the machine 1. Numerous commercially available micro processors may be configured to perform the functions of the control arrangement 32 but it should be appreciated that the control arrangement 32 could readily embody a general machine micro processor capable of controlling numerous machine functions. The control arrangement 32 may include a memory, a secondary storage device, a processor and any other components for running an application. Various other electronic circuits may be associated with the control arrangement, such as power supply circuitry, signal conditioning circuitry, data acquisition circuitry, signal output circuitry, signal amplification circuitry and other types of circuitry known in the art. The control arrangement 32 may include one or more electronic maps, for example stored within an internal memory of the control unit 33. These maps may include a collection of data in the form of tables, graphs and/or equations.

The operator input device 35 may embody single or multi-axis joy sticks, wheels, knobs, push-pull devices, buttons, peddles, switches and other operator input devices known in the art. The operator input device 35 may be located on or of the machine 1. In one embodiment, the operator input device 35 may be located in an operator station 36 located on the machine 1. The operator input device 35 may be located proximal to an operator seat and may or may not be associated with a console.

Figure 3:
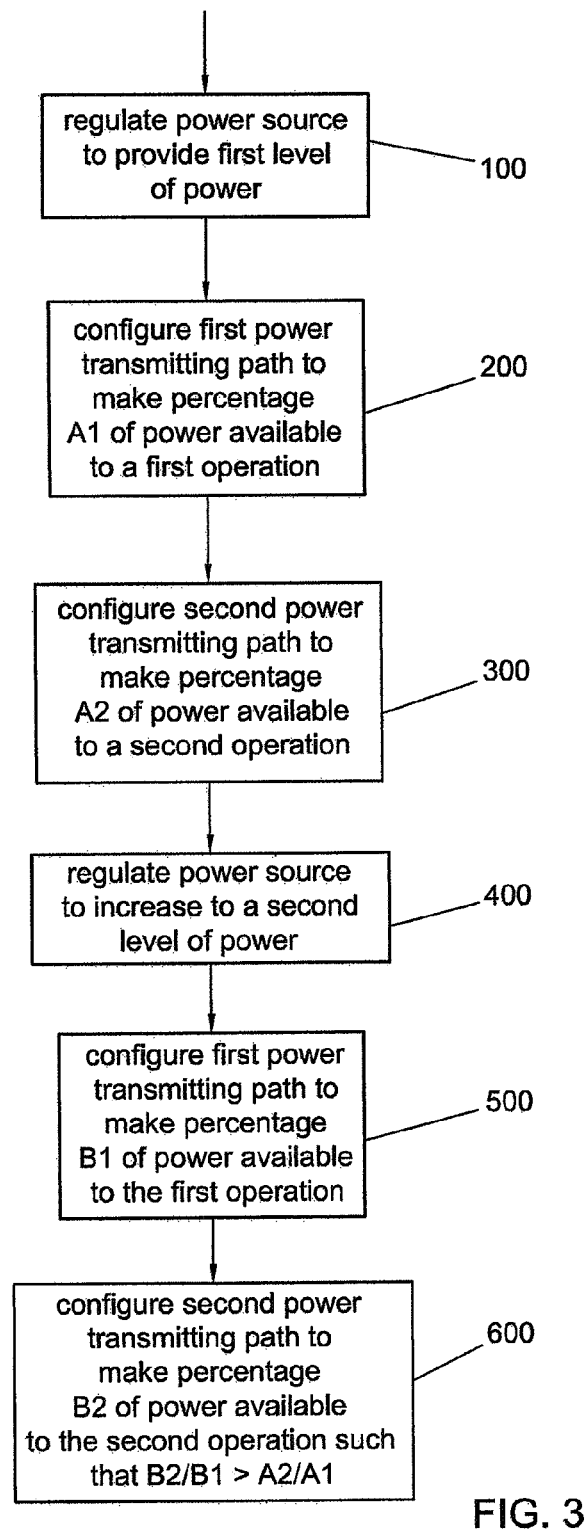
FIG. 3 is flow chart depicting an exemplary method of controlling the machine of FIG. 1.

FIG. 3 is a flow chart depicting an exemplary method of controlling the machine 1 of FIG. 1, and shall be discussed in the next section.

INDUSTRIAL APPLICABILITY

The disclosed machine power control may be applicable to any machine 1. By means of the power control, an increase in power may be made available to actuate a work implement 3' such that the ratio to the power that is made available to actuate another implement is increased. The machine power control with ratio increase shall be described using the exemplary disclosed embodiment shown in FIG. 1 and FIG. 2. FIG. 1 shows a mobile machine 1. A mobile machine 1, such as a track-type tractor, bulldozer, wheel loader, motor grader or other type of heavy equipment, may be used for a variety of tasks. In order to accomplish these tasks, the power source 2 of the machine 1 is configured to provide power. The implements 3 of the machine 1 may be configured to provide operations. A traction device 5 may for example be provided as an implement 3 to propel the machine 1. In particular, the mobile machine 1 may be moved around by driving the four wheels 5' of the traction device. A number of implements 3 of the machine 1 may be work implements 3' that are configured to provide work operations. In the exemplary disclosed embodiment of FIG. 1, the work operation may include actuating the boom 4 by actuating the hydraulic cylinder 7 so that the boom 4 may be raised or lowered. Another work operation may include actuating the further hydraulic cylinder 7' so that the bucket 9 carried on the boom 4 may be driven to swivel about the further pivot 8' on the end of the boom 4 via the linkage system 10.

In operation, the power source 2 may provide a first level of available power. For example, when the power source 2 is embodied as an engine it may be run at a high idle, that is a substantially constant number of revolutions which is elevated compared to the stationary base level. A percentage A1 of the first level of available power is provided to a first operation. For example, a percentage A1 of the first level of available power may be used to drive the machine 1 via the transmission 14. In the exemplary disclosed embodiment shown in FIG. 2, the power source 2 may directly drive the two pumps 15 that are fluidly connected to the two hydraulic motors 16 in the dual path configuration. The hydraulic motors 16 may each drive a wheel 5' on opposite sides of the traction device 5. Based on the operator input, the control arrangement 32 may set the displacement of the hydraulic pumps 15 and/or the stroke of the hydraulic motor 16, so that the speed and torque of the wheels 5' may be set individually. In another embodiment, the first operation may also be a work operation.

A percentage A2 of the first level of available power may be used to provide a second operation that is a work operation. In the embodiment shown, a percentage A2 of the first level of available power may be used to actuate the hydraulic cylinder 7 so that the boom 4 may be raised or lowered. The power source 2, which in the exemplary disclosed embodiment is an engine, drives a variable displacement hydraulic pump 20. The hydraulic pump 20 pressurizes hydraulic fluid from the tank 21 and circulates it through a hydraulic circuit 11. Although not shown in the drawing, the hydraulic circuit 11 may comprise a large number of other hydraulic consumers and/or components. Hydraulic fluid of high pressure may be supplied to the control valve 22. When lifting the boom 4, the control valve 22 may meter the hydraulic fluid flow and may pass the high pressure fluid via the first hydraulic line 30 to the first chamber 25. Hydraulic fluid of low pressure may be drained from the second chamber 25 via the second hydraulic line 31 and may pass through the control valve 22 via the low pressure drain line 29 to the tank 21. Due to the imbalance in force generated in the hydraulic cylinder 7, the piston assembly 23 may move to the right in FIG. 2, which may cause the boom 4 to pivot upwards as shown in FIG. 1. To lower the boom 4, the control valve 22 may switch the hydraulic connections so that the high pressure supply line 28 is connected to the second hydraulic line 31 extending to the second chamber 25 and the low pressure drain line 29 may be connected to the first hydraulic line 30 extending to the first chamber 25. Alternatively, the control valve 22 may block fluid flow to keep the boom 4 in a fixed position. The fluid flow to the hydraulic cylinder 7 may be metered by the control valve 22 and may for example be set at a maximum pass value. Further, the fluid flow may be set by controlling the capacity of the hydraulic pump 20. However, especially when there is a plurality of hydraulic consumers arranged on the same hydraulic circuit 11, for example hydraulic actuators for other work implements 3', the level of available power to provide the work operation may not be enough. For example, even when the hydraulic pump 20 is set to be at its fullest capacity and the meter-in orifice is set at the maximum pass value, the travel speed of the piston assembly 23 may still not be satisfactory to the operator.

In accordance with the disclosure, the performance may be boosted by increasing the level of available power to a second level and by using a percentage B1 of the second level of available power to provide the first operation and by using a percentage B2 of the second level of available power to provide the second operation, such that the ratio B2/B1 is greater than the ratio A2/A1. An increase in the level of power that is made available to an implement may for example be an increase in the flow and/or pressure of a hydraulic fluid that is made available to the implement. The increase in power that is made available to the implement may for example lead to an increase in speed of the implement.

The level of available power may for instance be increased from a first level of available power to a second level of available power by increasing the level of power that is provided by a power source above a high idle operating level of the power source 2. For example, the power source 2 may be set to operate at a highest idle level. In another embodiment, the power source 2 may be set to temporarily provide power above the highest idle level. By increasing the level of available power, use may be made of any excess power that is available from the power source 2 to boost work performance. By simultaneously increasing the ratio of the power that is used to perform target work operation relative to other operations, the target operation may benefit most from the power increase. Further, by increasing the ratio while increasing the level of available power, the level of power that is provided to perform the other operations may be kept substantially constant.

The machine power control with ratio increase may, as illustrated in the exemplary disclosed flow chart of FIG. 3, be implemented as follows. The control arrangement 32 may regulate the power source 2 to provide a first level of available power (step 100). Further, the control arrangement 32 may configure a first power transmitting path 12 to make a percentage A1 of the first level of power available to provide a first operation (step 200). In addition, the control arrangement 32 may configure a second power transmitting path 13 to make a percentage A2 of the first level of power available to provide a second operation (step 300), at least one the second operation being a work operation. The steps 100 through 300 need not necessarily be performed in the order given here, and two or more steps may be performed at the same time. For example, in one embodiment, first steps 200 and 300 may be carried out simultaneously, while step 100 may be carried out thereafter. In yet another embodiment, step 100 may be carried out first, then step 300, and then step 200.

In the exemplary disclosed embodiment, the first operation may correspond to driving the machine 1, and configuring the first power transmitting path 12 to make a percentage A1 of the first level of power available to provide a first operation may include using the control arrangement 32 to set the displacement values of pumps 15 and the stroke values of hydraulic motors 16 at a level of 50% of the available power e.g. corresponding to a destined machine travel speed entered into the control arrangement 32 via the operator input. Regulating the power source 2 to provide a first level of available power may include the engine control unit 33 in the control arrangement 32 to set the power source 2 at a high idle, for example 2000 RPM in an embodiment in which the power source 2 is a diesel engine. The step of configuring the second power transmitting path 13 to make a percentage A2, for example 5%, of the first level of power available to provide a second operation may in the exemplary disclosed embodiment of FIG. 1 include setting the variable flow of the hydraulic pump 20 in the additional power system 19 at a desired level and setting the control valve 22 to actuate the hydraulic cylinder 7 so that it extends the hydraulic cylinder 7 and lifts the boom 4 corresponding to a boom lift command entered into the control arrangement 32 by the operator via the operator input device 35. Further, setting the control valve 22 may include setting the flow to the actuator by setting the orifice.

In accordance with the disclosure, as a next step, the control arrangement 32 may increase the first level of available power of the power source 2 to a second level of available power (step 400). In addition, the control arrangement 32 may configure the first power transmitting path 12 to make a percentage B1 of said second level of power available to provide said first operation (step 500). In addition, the control arrangement 32 may configure the second power transmitting path 13 to make a percentage B2 of said second level of power available to provide said second operation (step 600), such that the ratio B2/B1 is greater than the ratio A2/A1.

For example, the second level of available power may correspond to 2500 RPM, and the percentages B1 and B2 may be set at 40% and 50% respectively. The steps 400 through 600 may be triggered by the control arrangement 32 upon detecting a relatively big demand for a work implement, for example when the operator input device gives in a relatively high demand value for a specific work operation. An increase in power for a target work task may be given in via the operator input device 35. The control arrangement 32 may sense a relatively large demand for a target task. The demand may be large is absolute terms, but may also be relatively large compared to the level of power provided to other operations. Operator demand values for various work implements that trigger the control arrangement to implement power level increase with ratio control may for example be stored in a electronic map.

The steps 400 through 600 need not be performed in the order given above, and two or more of the steps may be carried out simultaneously. For example, steps 500 and 600 may be simultaneously carried out after the group of steps 100 through 300, and the step 400 may be carried out after steps 500 and 600 have been carried out. In another embodiment, step 400 may be carried out after the group of steps 100 trough 300, than step 600 and subsequently step 500. In the exemplary disclosed embodiment shown in FIG. 2, increasing the first level of available power to a second level of available power may include temporarily increasing engine RPM above the highest idle level. Temporarily may for example include a time period ranging between several seconds to several minutes, and may in particular be several tens of seconds. The temporary increase may for example correspond to the duration of the task for a work implement 3' that corresponds to the work operation. In the exemplary disclosed embodiment, the second operation includes actuating a boom lift cylinder to lift the boom 4 of the machine 1, and may for example last about 15 seconds. In the exemplary disclosed embodiment of FIG. 2, configuring the first power transmitting path 12 to make a percentage B1 of said second level of power available to provide the first operation may include for example increasing the capacity of the pumps 15 and/or destroking the hydraulic motors 16 of the transmission 14, such that the machine 1 may be propelled by the traction device 5 at substantially the same speed in spite of the increase in the level of available power. In addition, the flow of the hydraulic pump 20 of the hydraulic circuit 11 of the additional power system 19 may be increased, as well as the orifice of the control valve 22. The power source 2 may be controlled to return to the first level of available power (step 700) for example when a predetermined time has lapsed or the target work operation has been completed. In the exemplary disclosed embodiment of FIG. 2, the control arrangement 32 may regulate the engine to return to the high idle level or to another desired level of lower power.

In case there are other hydraulic consumers active in the hydraulic circuit 11 of the additional power system 19, their respective control valve 22 may be set to reduce the orifice, to that the level of power that is made available to the hydraulic consumers is kept substantially constant in spite of the increase. In another embodiment, there may be provided further implements 3 that are connected to the power source 2 via a further power transmitting path. Such further power transmission path may for example include a power transmission path that is fully separate from the first or the second power transmission paths 12,13. Increase in power in that further path resulting from the increase of the level of available power to the second level may for example be dissipated using a dissipation circuit or flow resistance.

In another embodiment, the power output increase may be screened for unwanted effect of the output increase on a current operation. For example, a power output increase may not be fully or sufficiently compensated by adjusting the power transmission paths only, and the operation of one or more implements 3 may thus not be kept at substantially the same or level or at an acceptable increased level, a power output increase may be reduced or cancelled. For example, in the exemplary disclosed embodiment of FIG. 2, a proposed increase in engine RPM may be capped to prevent over-speeding of the machine 1 while boosting the boom lift operation. In another embodiment, a proposed increase in power level may be cancelled when boosting actuation of a blade may cause an undesired increase in winching speed. The control arrangement 32 may include a number of cross modulation maps, in which for a number of target operations and possible creases to the power level, power increase reduction data are stored for a range of possible other active operations.

In accordance with the disclosure, performance on a number of target operations may be enhanced in a number of situations. In one embodiment, the machine control with ratio increase may be fully implemented as a software program or software update in a control arrangement 32 of an existing machine 1 without need to make significant physical changes to the machine 1. Power level increase with ratio control may for example be implemented as a function of the control arrangement that may be manually switched on or off by the operator, or may for example be implemented as a function that is permanently active in the control arrangement.

It will be apparent to those skilled in the art that various modifications and variations may be made to the machine power control of the present disclosure without departing from the scope of the disclosure. Other embodiments will be apparent to those skilled in the art form consideration of the specification and practice of the machine power control disclosed herein. It is intended that the specification and examples be considered as exemplary only, with a true scope of invention being indicated by the following claims and their equivalents.

What is claimed is:

1. A control system for a machine having a power source configured to provide power, a number of implements including a work implement, configured to provide operations, and a number of power transmitting paths configurable to selectively make power available to the implements to perform operations, the control system including:
   a control arrangement configured to:
   regulate the power source to provide a first level of available power;
   configure a first power transmitting path to make a percentage A1 of said first level of power available to provide a first operation;
   configure a second power transmitting path to make a percentage A2 of said first level of power available to provide a second operation, at least the second operation being a work operation;
   increase said first level of available power of said power source to a second level of available power;
   configure the first power transmitting path to make a percentage B1 of said second level of available power available to provide said first operation, and
   configure the second power transmitting path to make a percentage B2 of said second level of power available to provide said second operation, such that the ratio B2/B1 is greater than the ratio A2/A1; wherein upon increasing said first level of available power, power that is made available to actuate the work implement is increased, and power that is made available to at least one other implement is kept substantially at the same level.

2. The control system of claim 1, wherein said first level of available power corresponds to a high idle operating level of the power source.

3. The control system of claim 2, wherein the power transmitting path that makes power available to the work implement includes a device that regulates a flow of hydraulic fluid to the work implement.

4. The control system of claim 3, wherein the power transmitting path that makes power available to the work implement branches available power off a hydraulic circuit that makes power available to other work implements.

5. The control system of claim 4, wherein the work implement is a boom and the other work implements include a traction device.

6. The control system of claim 5, wherein the power transmitting path that makes power available to the traction device receives power directly from the power source.

7. The control system of claim 6, wherein the control arrangement is configured to screen before increasing the level of available power of the power source for unwanted effect of the output increase on a current operation.

8. The control system of claim 1, wherein the at least one of the other implements that is kept substantially at the same level is a traction device.

9. A method of controlling a machine comprising:
   providing a first level of available power;
   using a percentage A1 of said first level of available power to provide a first operation;
   using a percentage A2 of said first level of available power to provide a second operation, at least the second operation being a work operation;
   increasing said first level of available power to a second level of available power;
   using a percentage B1 of said second level of available power to provide said first operation, and
   using a percentage B2 of said second level of available power to provide said second operation such that the ratio B2/B1 is greater than the ratio A2/A1; wherein upon increasing said first level of available power, power that is made available to provide the work operation of a work implement is increased, and power that is made available to provide the work operation of at least one other implement is decreased.

10. The method of claim 9, wherein the level of power that is generated is increased above a high idle operating level of the power source.

11. The method of claim 10, wherein increasing the ratio A2/A1 to B2/B1 includes increasing a flow of hydraulic fluid to the work implement.

12. The method of claim 11, wherein actuating the work implement includes lifting a boom, and the work operation of the at least one other implement includes driving a traction device.

13. The method of claim 8, wherein the at least one of the other implements that is decreased is a traction device.

14. A machine, including:
   a power source configured to provide power;
   a number of implements including a work implement, configured to provide operations;
   a number of power transmitting paths configurable to selectively make power available to the implements to perform operations;

a control system including a control arrangement configured to:

regulate the power source to provide a first level of available power;

configure a first power transmitting path to make a percentage A1 of said first level of power available to provide a first operation;

configure a second power transmitting path to make a percentage A2 of said first level of power available to provide a second operation, at least the second operation being a work operation;

increase said first level of available power of said power source to a second level of available power;

configure the first power transmitting path to make a percentage B1 of said second level of power available to provide said first operation and configure the second power transmitting path to make a percentage B2 of said second level of power available to provide said second operation, such that the ratio B2/B1 is greater than the ratio A2/A1; wherein upon increasing said first level of available power, power that is made available to actuate the work implement is increased, and power that is made available to at least one other implement is kept substantially at the same level.

15. The machine of claim 14, wherein the power transmitting path that makes power available to the work implement includes a device that regulates a flow of hydraulic fluid to the work implement.

16. The machine of claim 15, wherein the power transmitting path that makes power available to the work implement branches available power off a hydraulic circuit that makes power available to other work implements.

17. The machine of claim 14, wherein the at least one of the other implements that is kept substantially at the same level is a traction device.

* * * * *